Figure 1:
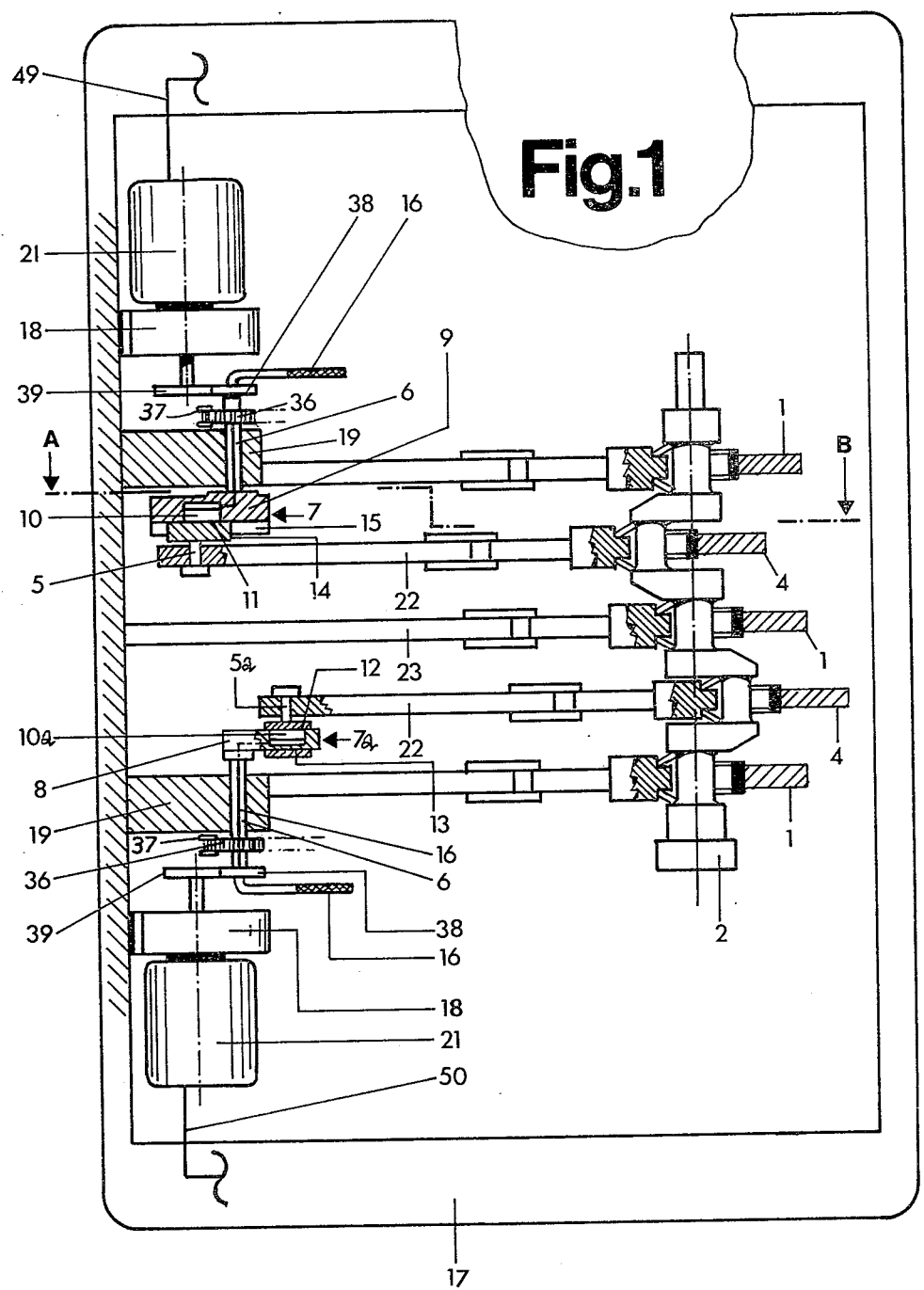

United States Patent [19]

Wittkopp et al.

[11] 4,437,328
[45] Mar. 20, 1984

[54] CRANKSHAFT GLAZE OR SMOOTH ROLLING MACHINE

[75] Inventors: Helmut Wittkopp; Valentin Büschgens, both of Erkelenz, Fed. Rep. of Germany

[73] Assignee: Wilhelm Hegenscheidt Gesellschaft MbH, Erkelenz, Fed. Rep. of Germany

[21] Appl. No.: 350,190

[22] Filed: Feb. 19, 1982

[30] Foreign Application Priority Data

Mar. 7, 1981 [DE] Fed. Rep. of Germany ....... 3108780

[51] Int. Cl.³ .................................................. B21H 7/00
[52] U.S. Cl. ........................................... 72/110; 29/6; 74/600
[58] Field of Search ................. 72/107, 110; 29/6; 74/600, 601

[56] References Cited

U.S. PATENT DOCUMENTS

| 2,336,044 | 12/1943 | Stuart | 74/600 |
| 3,216,277 | 11/1965 | Groll | 74/600 |
| 3,735,620 | 5/1973 | Naumann | 72/108 |
| 4,044,630 | 8/1977 | Adams | 74/600 |
| 4,056,994 | 11/1977 | Ihle | 74/600 |

Primary Examiner—Lowell A. Larson
Attorney, Agent, or Firm—Arthur B. Colvin

[57] ABSTRACT

A crankshaft rolling machine rotatably guides a crankshaft to be rolled. At least one movable rolling fixture carrying rolling dies is positionally controlled by two synchronously driven rotatable cranks having parallel mounting shafts. Eccentric crank pins are coupled to the fixture. An adjustable connection is interposed between crank pins and mounting shafts of the cranks.

4 Claims, 5 Drawing Figures

CRANKSHAFT GLAZE OR SMOOTH ROLLING MACHINE

The invention relates to a crankshaft rolling machine with means to guide and seat a crankshaft and with at least one movable rolling fixture supporting rolling dies, each movable rolling fixture being supported and moved by two synchronously driven cranks mounted stationarily but rotatably in the machine on main pins for the crankshaft.

Machines of this kind are known from German De PSNOS. 10 70 955 and DE PS 11 18 645, for example. These machines have proven out well in practice for many years. But their decisive drawback is that, due to their design, they are in a position to machine crankshafts of a narrowly defined type only—namely the type for which they are designed. In actual production, however, crankshafts have to be machined which differ in their stroke length while their other dimensions are the same. Since the known machines can roll a narrowly defined crankshaft type only, a specific rolling machine is needed for each crankshaft type in production. This is the more disagreeable as the said crankshaft rolling machines have only a short work cycle so that the machine capacity is poorly utilized by the arriving crankshaft lot sizes.

Also known from transmission engineering (Europa—Fachbuchreihe, Technical Knowledge for Metal Processing Professions, Veriag Willing & Co., Europa—Lehrmittel OHG, Wuppertal-Barmen, page 214) are cranks with variable stroke length. Cranks of this kind are used - as the cited literature mentions also—in planers, for instance.

It is an object of the invention to further develop machines of the kind described at the outset so that machining of crankshafts of different stroke lengths becomes possible on one and the same machine.

According to the invention, this problem is solved in machines of the kind described in that the cranks are adjustable stroke cranks, each crankpin being shiftable and lockable at its connecting part to the associated main pin. The movable rolling fixtures are moved in exactly the same manner by the crankpins of the cranks as is the crankpin to be rolled of the crankshaft to be machined. If a crankshaft is to be machined whose crankpin stroke differs from that of the preceding crankshaft, then the crankpins of the cranks supporting the movable rolling fixtures are adjusted prior to the machining operation by shifting them on the connecting part on which they are mounted. What this achieves is that the stroke of the cranks supporting the rolling fixtures is the same as that of the respective crankshaft to be machined so that the movement of the movable rolling fixtures is the same as that of the crank pin of the respective crankshaft to be machined so that the movable rolling fixtures are being moved correctly again.

An alternative solution is seen in that the crankpins are disposed in elongated holes in discs rotatably mounted in a support for each movable rolling fixture and that there is mounted in each crankpin a movable piston which is acted upon by a fluid and can be pressed against a long sidewall of the elongated hole. This, too, involves an adjustable stroke crank, but the stroke adjustment is accomplished not by shifting the crankpin but by shifting the disc provided with an elongated hole. Thus, the disc must be viewed here as the actual crankpin. The crankpin of the crank is here merely a portion of the connecting part between main pin and crankpin, standing at an angle.

According to one embodiment of the invention it is suggested that the connecting part contain a piston which is acted upon by fluid and can be pressed directly or through adapters against a countersurface of a shifting element which supports the crankpin and is movable in radial direction along the connecting part over a range of adjustment and is supported by the connecting part. Such an embodiment permits in simple manner the automatic adaptation of the crank stroke of the cranks supporting the movable rolling fixtures to the crankpin stroke of a crankshaft to be machined, regardless of whether the stroke modification is necessitated by manufacturing tolerances or by a change of crankshaft types.

According to another embodiment of the invention it is suggested that the connecting part be a disc with radially extending guiding means, the shifting element and the piston acted upon by a fluid being mounted in said guiding means. With this design, movability and lockability of the crankpins supporting the movable rolling fixtures are obtained in particularly simple manner.

According to yet another embodiment of the invention it is suggested that the connecting part be designed as pin oriented radial to the main pin and containing a fluid canal ending in the cylinder chamber containing the movable piston, and that the shifting element have an opening oriented perpendicular to the crankpin and enclosing the pin and the movable piston disposed therein at least in the entire range of adjustment, the surface of the opening forming the countersurface for the movable piston or the adapter. This is a design variant with which movability and lockability of the crankpins supporting the movable rolling fixtures is achieved also in particularly simple manner.

According to yet another embodiment of the invention it is suggested that the two cranks of each movable rolling fixture be driven independent of the two cranks of all other movable rolling fixtures, the drives being synchronizable among each other, however, this measure makes it possible to accommodate crankshafts with different strokes also in cases where their crankpins are arranged in different angular positions. Due to the individual drives, the movable rolling fixtures can be adjusted to the respectively required angular position of the crankpins of the next crankshaft to be rolled and then moved again jointly, in this position via the synchronization.

Figure 2:
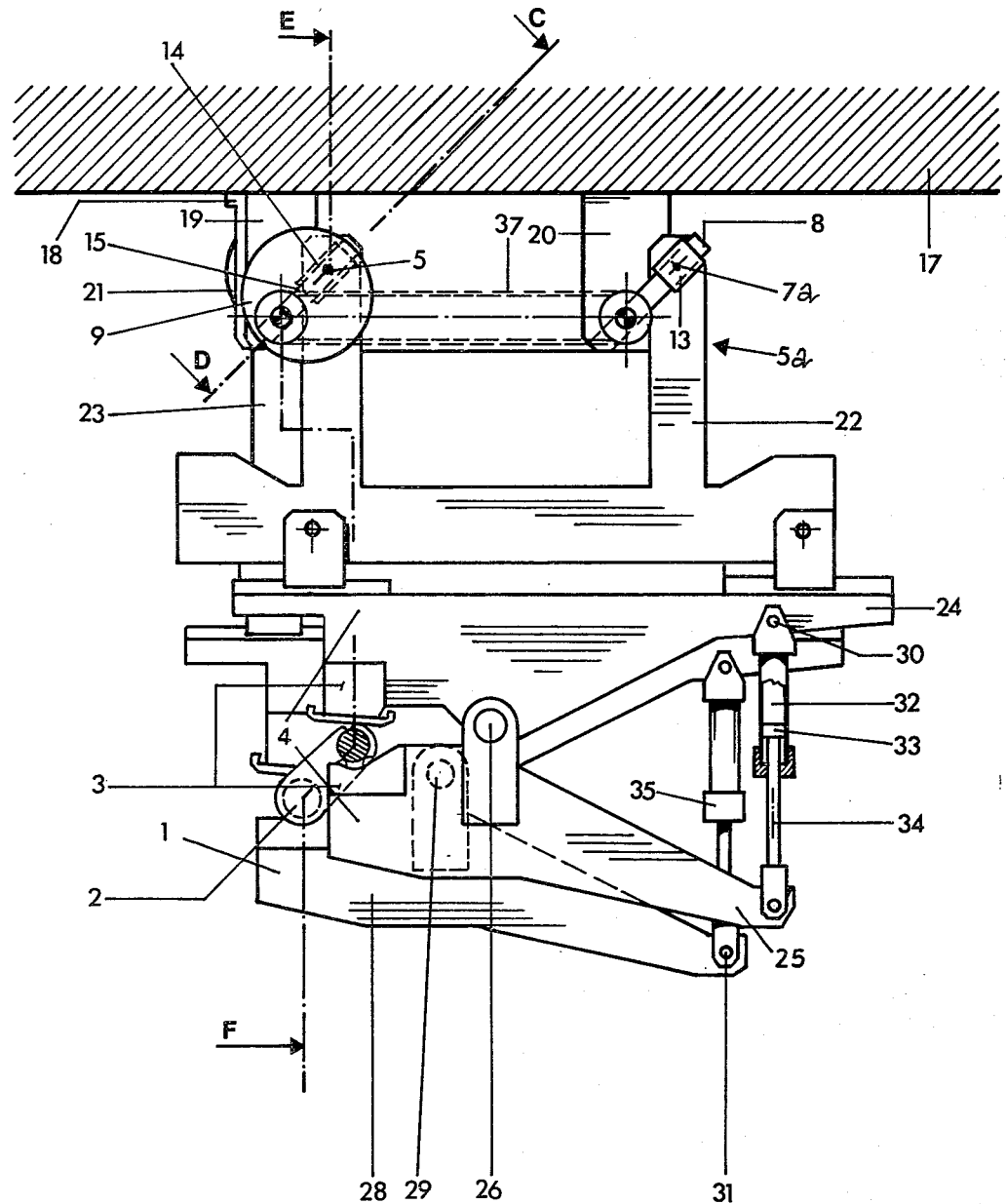
Figure 2A:
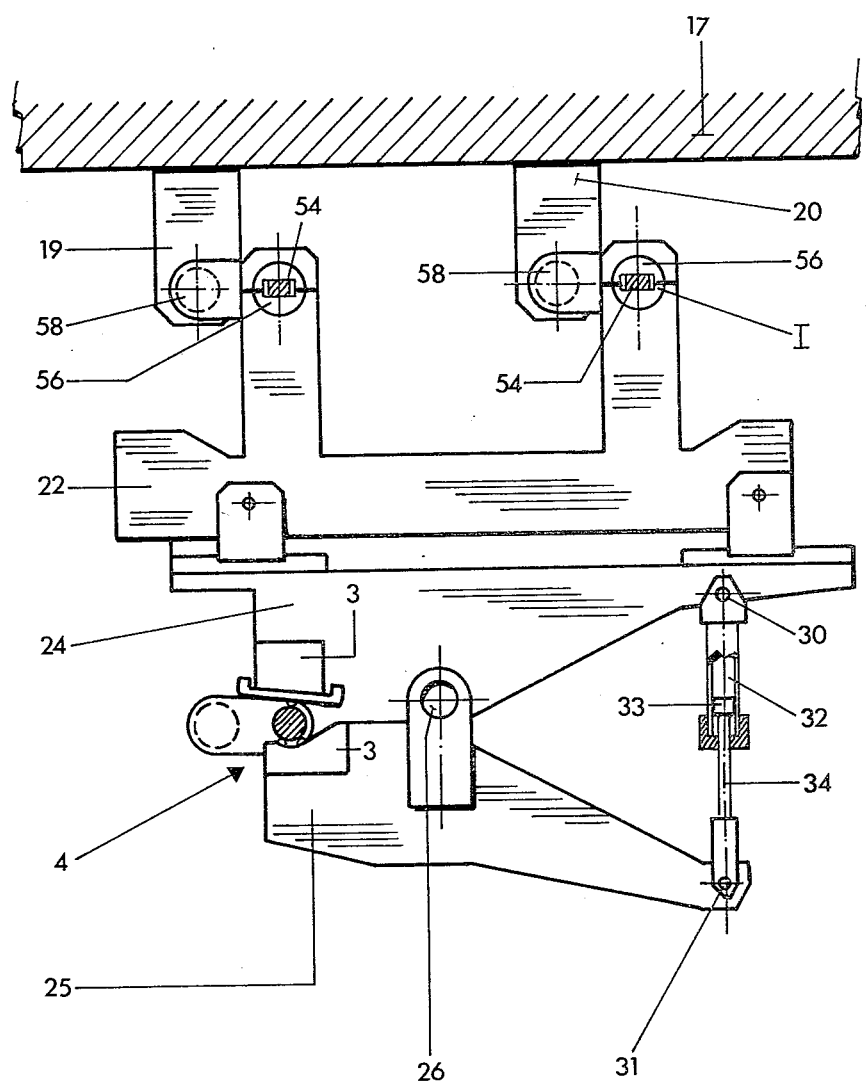
Figure 3:
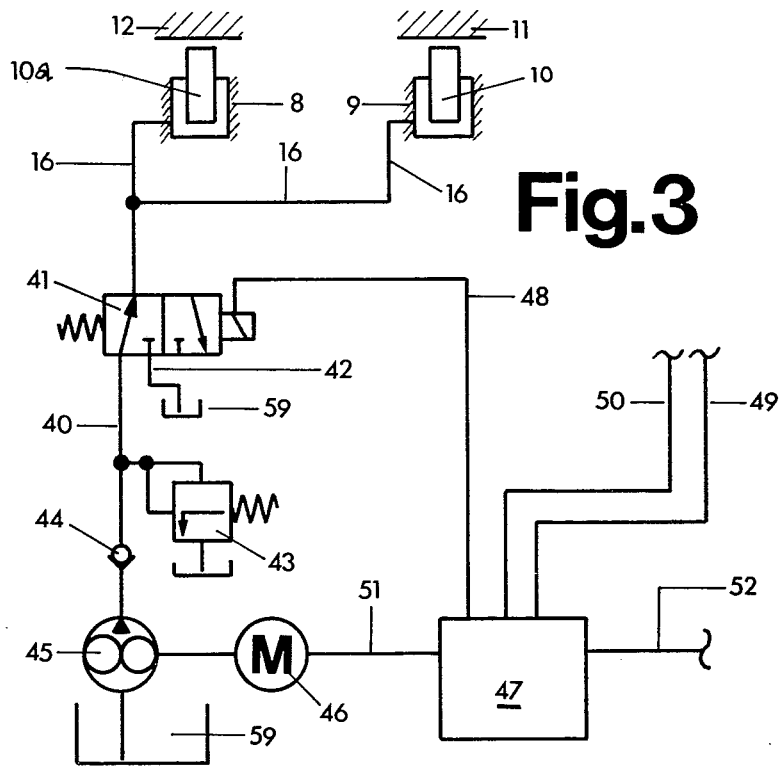
Figure 4:
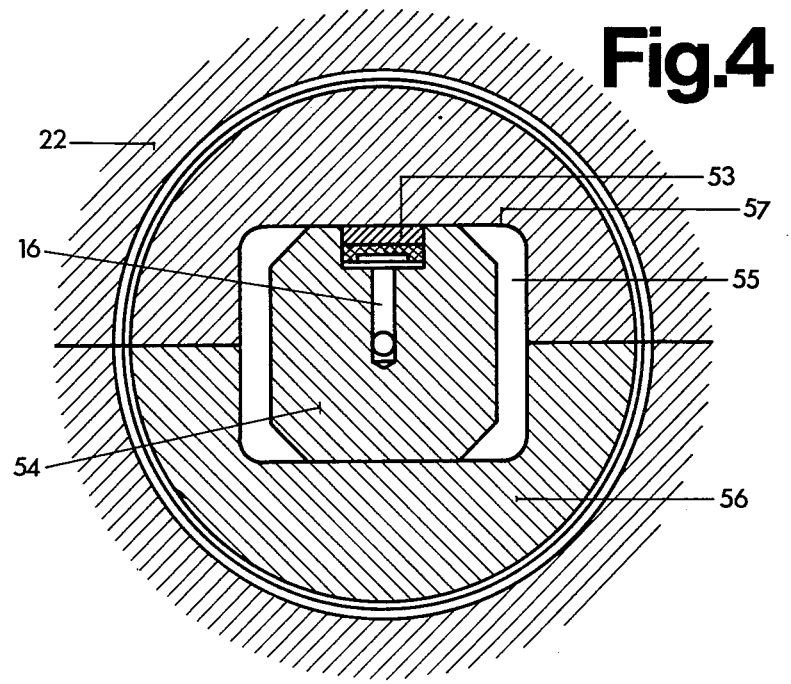

The invention will now be explained in greater detail with reference to the attached drawings in which:

FIG. 1 shows a crankshaft rolling machine in section E—F and partly in section C—D of FIG. 2, FIG. 2 a crankshaft rolling machine in section taken along line A—B of FIG. 1, FIG. 2a a variant of FIG. 2, FIG. 3 a schematic of the hydraulic system, FIG. 4 is detail of FIG. 2a.

Positioned in bearing blocks 19 and 20 fastened to the machine housing 17 are cranks 7 and 7a secured to their main pins 6. Each main pin 6 is fixed to a sprocket wheel 36. A chain 37 connects the main pins of one crank 7 and 7a each. The main pins 6 are also fixed to gear 38 which meshes with a gear 39 driven by an associated motor 21 via a transmission 18 secured to housing 17, thus providing the rotary drive for crank 7 and crank 7a.

Each main pin 6 respectively, supports on a connecting part 8, 9, respectively, a shifting element 13, 14, respectively, to which is fastened a crankpin, 5, 5a, respectively. Each shifting element 13, 14 is mounted on its connecting part 8, 9 so as to be movable and lockable to provide a crank with an adjustable stroke.

A movable rolling fixture 4 is mounted to and supported by the crankpins 5 and 5a of the cranks 7 and 7a, respectively, by means of a two-sided lever 24 fastened to a support 22. Another two-sided lever 25 is pivotally hinged to the first two-sided lever by means of a pin 26. Both two-sided levers 24 and 25 support at their one end, in known manner, mutually cooperating parts of a known rolling die 3. Fastened to the other end of the two-sided lever 24 via a joint 30 is a hydraulic cylinder 32, in which slides a piston 33 connected to the two-sided lever 25 via a piston rod 34 and the joint 31. An hydraulic cylinder 35 is connected in the same manner to the two-sided levers 27 and 28 of an immovable rolling fixture 1, at whose free end known rolling dies are mounted also. The two-sided lever 27 of each immovable rolling fixture 1 is fastened to the machine housing 17 via a support 23.

To be able to accept a crankshaft, the pistons of the hydraulic cylinders 32 and 35 are retracted in starting position so that the rolling tools disposed on the other side of the two-sided levers are open like jaws. The crankshaft 2 to be rolled is now inserted manually or automatically into the lower parts of the rolling dies disposed on the two-sided levers 25, 28, respectively. Thereafter, by actuating the hydraulic cylinder 35, the rolling dies of the immovable rolling fixtures are moved together first, which thus grip around the main bearing pins of the crankshaft 2, thus, guiding and seating them.

However, the crankshafts arriving at the machine may differ in their stroke by a few millimeters. For the rolling machine to be able to adjust itself to this, the movable rolling fixtures 4 are caused, in the same manner as already described in connection with the immovable rolling fixtures 1, to make contact with the crank pins of crankshaft 2 by actuating the hydraulic cylinder 32. But in so doing, the hydraulic cylinders 32 are pressurized only so that the known rolling dies contact the crank pins of crankshaft 2 with little force only. Now, for adjustment of the machine to the crankshaft stroke of the crankshaft 2 to be processed, the shifting elements 13,14 must be moved accordingly on their respective connecting parts 8, 9. In the case of the connecting part 9, the shifting element 14 slides in guiding means 15 designed as dovetail slot, the connecting part 9 being in the shape of a disc eccentrically disposed on the main pin 6.

The connecting part 8 of crank 7a is designed as a radially oriented pin encompassed by the shifting element 13. These variants of connecting parts and shifting elements represent only embodiment examples, however. Other variants are imaginable also. It is advantageous to use only one variant of connecting parts and shifting elements in one and the same machine. It is only for reasons of graphic representation that several variants in one machine are shown in the embodiment example.

The connecting part 9 contains a piston 10, the connecting part 8 a piston 10a. The pistons 10, 10a are acted upon hydraulically through the fluid canal 16, thereby being pressed against the countersurfaces 11, 12 of the shifting elements 14 and 13, respectively, so that the latter are locked in their position. This state is shown in the schematic of the hydraulic system according to FIG. 3. In the situation shown, the valve 41 connects the cylinder chambers of the pistons 10 and 10a through the fluid canal 16, the fluid canal 40, and through the check valve 44 to the pump 45 which is driven by an electric motor 46. A line 51 connects the electric motor 46 to a machine control 47 from whence it is controlled. The pressure of the hydraulic system and, hence, the locking force of the pistons 10 and 10a is set at the pressure limiting valve 43. The check valve 44 sees to it that the pistons 10 and 10a stay pressurized if the pump 45 should fail. A line 48 connects the valve 41 to the machine control 47, from where it is actuated manually or automatically, depending on the control design.

If the valve 41 is switched into its other position, it connects the fluid canal 16 to the tank 59 via the tank line 42. In this position, the pistons 10 and 10a exert no more pressure against the countersurfaces 11 and 12 so that the corresponding shifting elements 13 and 14, respectively, can be moved freely and easily. When this state has been reached, the not shown hydraulic system for the hydraulic cylinders 32 and 35 is manipulated by the machine control 47 via the line 52 so that the hydraulic cylinders 32 are pressurized by the fluid that the known rolling fixtures 4 contact the crankpins of the crankshaft 2 to be rolled with the initial rolling pressure. In so doing they center themselves at the same time by the position of this crankpin and that of the shifting element 14 or 13 on the connecting parts 9 or 8, respectively, associated with it. This causes the stroke of the cranks 7 and 7a, respectively, to adapt to the stroke of the crankshaft 2 to be rolled. Thereafter, the machine control 47 switches the valve 41 back into its other position so that the pistons 10, 10a contact their countersurfaces 11, 12 again with the locking force required to fix the shifting elements 14,13 in their position.

Now the machine control 47 activates the motors 21 simultaneously via the lines 49, 50, so that all cranks 7, 7a now turn synchronously, thereby also rotating and rolling, via the movable rolling fixtures 4, the crankshaft 2 to be rolled which is retained and mounted by its main journal bearings in the dies of the immovable rolling fixtures 1.

Accordingly, the machine adapts completely automatically to the different strokes of the crankshafts to be rolled in the manner described.

The description of the embodiment example applies to a crankshaft offset by 180°. However, the cranks 7,7a of each movable rolling fixture 4 are each driven independently of the same cranks of all other movable rolling fixtures 4. In this manner it becomes possible to move each individual rolling fixtures into any desired angular position by means of the machine control. Therefore, the machine can be adjusted also to crankshafts of different offset angles. Accordingly, crankshafts with different strokes can be machined even when they have different offset angles. The adjustment for different offset angles can be made automatically through the machine control or manually, depending on whether an operator enters the respectively arriving crankshaft type into the machine control or whether the automatic feeding mechanism for the crankshaft enters the type of the inserted crankshaft into the machine control. Accordingly, one and the same machine can process crankshafts with different stroke even when they also have different offset angles. Moreover, the machine adapts steplessly to the crankshaft stroke so that slight dimensional deviations in identical crankshafts no longer cause stresses in the machine which would have to be absorbed by costly design measures.

What has been said above also applies to the variant shown in FIG. 2a. In this variant, the two cranks 58 are rigid cranks per se whose crankpins 54 are square in cross-section. This crankpin 54 is disposed in a corresponding elongated hole 55 (FIG. 4) in a disc 56. The two discs 56, in turn, are rotatably mounted in appropriate holes in the already described supports 22 for the movable rolling fixtures 4.

FIG. 4 shows the detail I of FIG. 2a, from which it may be seen that the crankpin 54 has a movable piston 53 which can be acted upon by hydraulic fluid through the fluid channel 16, thereby being pressed against the long sidewall 57 of the elongated hole 55. In this manner, the crankpin 54 is locked in the disc 56. Adaptation to different strokes of the crankshaft to be rolled is accomplished in that the movable rolling fixture 4 with its support 22 is moved by the required amount on the crankpin 54 in the area of the elongated hole 55.

The above described invention thus makes it possible for the first time to roll, on one and the same machine, crankshafts of different strokes without costly setup work for retooling, and that regardless of whether these crankshafts arrive in lost or singly in random order.

The embodiments of the invention in which an exclusive property or privilege is claimed are defined as follows:

1. A crankshaft rolling machine comprising a base, means on said base for mounting a crankshaft for rotation about a fixed axis, a least one rolling fixture movably mounted on said base, said fixture including rolling dies, a pair of crank assemblies each having a main pin mounted on said machine, said main pins being rotatable about parallel axis, said crank assemblies each including a crank pin offset from the axis of its said main pin, adjustable connecting means interposed between said crank pins and said main pins of each said crank assembly for variably offsetting said crank pins in a radial direction from the axis of said main pins, motion transmitting means coupling each said crank pin to said rolling fixture, and drive means connecting said crank assemblies for synchronously rotating said main pins about said parallel axis.

2. A machine in accordance with claim 1 wherein said connecting means each comprises a locking surface disposed generally radially with respect the said main pin axis and a hydraulicly driven piston shiftable toward and away from said surface between a locking position whereat said piston engages said surface and a releasing position spaced from said surface.

3. A machine in accordance with claim 2 wherein said connecting means each comprises a disk including a radially extending guide slot having a radially directed wall defining said surface.

4. A machine in accordance with claim 2 wherein said connecting means comprises a support pin extending radially from said main pin, said support pin including a fluid passageway, and said piston is mounted in a bore opening to said surface and communicating with said passageway.

* * * * *